Patented Sept. 16, 1941

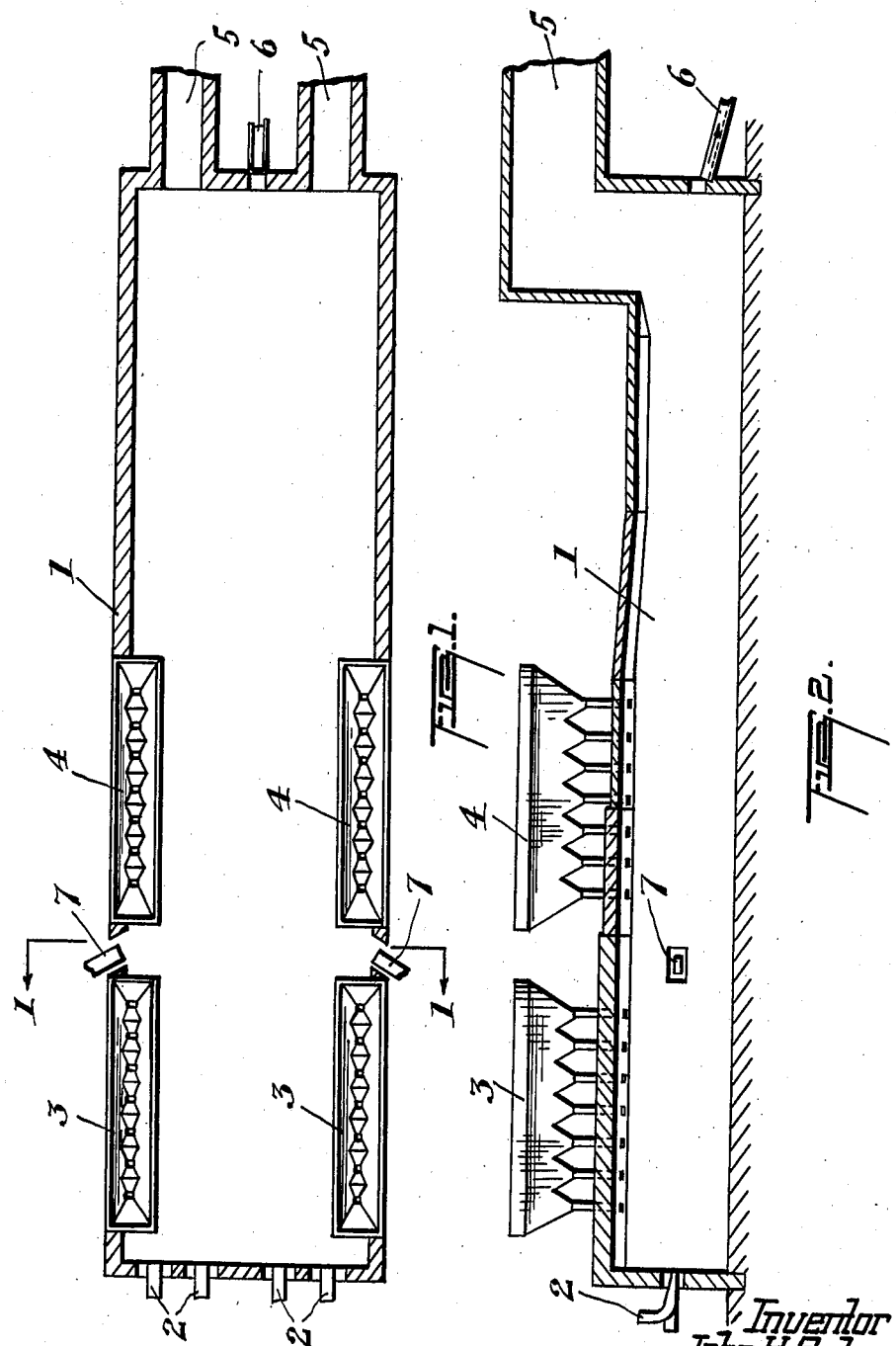

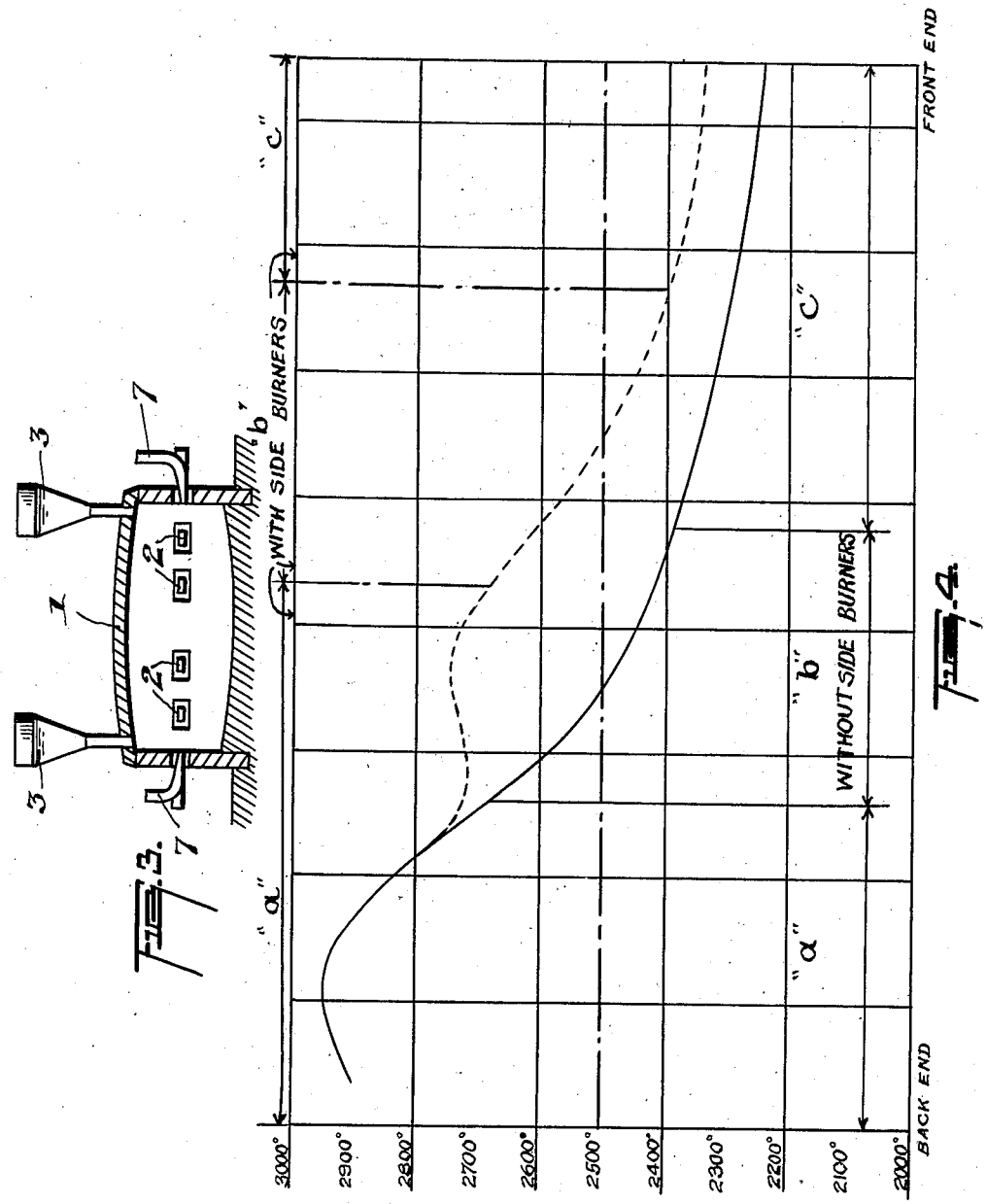

2,256,271

UNITED STATES PATENT OFFICE 2,256,271

REVERBERATORY FURNACE

John Howard Ambrose, Flin Flon, Manitoba, Canada, assignor to Hudson Bay Mining & Smelting Co. Limited, Flin Flon, Manitoba, Canada Application February 20, 1940, Serial No. 319,986
In Canada February 20, 1939

3 Claims. (Cl. 266—33)

The invention relates to reverberatory smelting furnaces.

Reverberatory smelting furnaces are long, narrow structures generally four times as long as they are wide, the dimensions varying within very wide limits, but a common size being approximately 100 feet long and 25 feet wide. They are generally used for the smelting of ore and other copper bearing materials to recover the copper and other valuable metals which may be present. Ore or concentrates and the necessary flux or fluxes which may be siliceous or basic are introduced at one end of the furnace and, on being heated, proceed along the length of the furnace until at the other end the charge has separated into slag and matte. The matte containing the metallic values settles to the bottom while the slag floats on the top. Slag and matte are removed separately and the matte is subjected to further metallurgical refining to extract the metal values. The gases from the heating are removed at the same end of the furnace at which the slag is taken off. Heating is done by the usual coal, gas or oil burners situated at the back end of the furnace, i. e. the end of the furnace opposite to that at which the slag is removed.

Due to the length of the furnace and to the fact that the heating is carried on only at one end, such a furnace can be considered as consisting of three zones, the smelting zone, which is where the heat is applied and the charge is introduced, the settling zone, which is at the opposite end of the furnace and from which the slag is removed and, due to the length of the furnace, a zone between these two, conveniently known as the intermediate zone. The charge is almost completely smelted in the smelting zone, proceeds down the furnace to the intermediate zone which is at a lower temperature than the smelting zone and where the smelting is completed and, finally, in the end zone the matte settles from the slag. The settling zone, of course, is at a still lower temperature than the intermediate.

In smelting with a reverberatory furnace of the type described, the siliceous flux and the ore are charged at one end of the furnace, smelted in the smelting zone, and proceed through the intermediate zone to the settling zone where the separation of matte and slag is completed and gases are removed. In most smelters, the charge introduced into a reverberatory furnace consists of coarse and fine material. The fine material generally consists of dust which has been collected from the precipitators and which is of a very fine nature, as well as other dusts and by-products from the smelter circuit. This fine material which is charged along with the remainder of the charge through hoppers situated toward the back end of the furnace very often results in the production of floaters. Floaters are coagulations of fine material which remain on the surface of the charge and are not smelted in the smelting zone but float down the furnace in their unsmelted conditions and in the settling zone are removed with the slag and without having their metal values separated.

The efficiency of a reverberatory furnace is based upon the amount of ore which a furnace can handle effectively for a given fuel consumption and upon the ratio of the metal recovered to the metal contained in the ore. In reverberatory furnaces of the known type, the separation of slag from matte is easier and the efficiency greatly increased if the amount of siliceous flux which is added with the charge is increased. The siliceous flux is of low specific gravity and consequently makes the slag much lighter. The latter therefore floats more easily on the matte and separates efficiently and quickly. The amount of siliceous flux which can be added, however, is limited among other considerations by the heating capacity of the furnace and if the amount is increased beyond certain limits the fuel consumption makes operation with these amounts uneconomical. Thus, the optimum separation which would be the result of increased amounts of siliceous material in the charge cannot be attained.

There is a further disadvantage of known types of reverberatory furnaces which results in further reduced efficiency. It is the result of the fact that the heating means are grouped at one end and that the bath of the furnace is at a progressively lower temperature from one end of the furnace to the other. Consequently, the zone in which the matte settles from the slag is the coolest part of the furnace. The fluid charge at this point has, therefore, an increased viscosity and because of this the separation of the charge into its two components takes place more slowly and less completely.

It is an object of the present invention to provide a reverberatory furnace in which the amount of metal values lost in the slag will be reduced to a minimum.

It is a further object of the invention to provide a reverberatory furnace which will eliminate as far as possible the production of "floaters."

It is also an object of the present invention to provide a reverberatory furnace which will operate with increased speed and efficiency and lower fuel consumption for a given capacity.

It is a further object of the invention to provide a reverberatory furnace which is so constructed that it will allow the use of a charge with increased amounts of siliceous flux.

In addition to the definitions of the smelting zone given above, it can also be described as that part of the furnace to which material can be charged so that the charge will be completely smelted before it reaches the settling zone. From this it will be seen that very little smelting takes place in the intermediate zone, and what does take place is very slow. Consequently, only small amounts of material of a definite type and for the protection of the furnace walls can be charged to the intermediate zone. Of course, no smelting whatsoever takes place in the settling zone.

According to the present invention the smelting zone of a reverberatory furnace is extended to include at least a part of the intermediate zone and in this way the amount of material which can be charged to the furnace is increased and the efficiency of the furnace raised. This is done by providing, in addition to the usual heating means situated at the back end of the furnace, further heating means along the side walls or through the arch of the furnace. Heating of the furnace may, as mentioned previously, be by means of any of the known types of burners, and the additional heating means are, of course, of the same type. In the case of burners the additional ones are preferably provided in pairs, one on each side of the centre line of the furnace, and where only one additional pair is provided they are preferably at or just before the boundary between the smelting and the intermediate zone. Where the burners are of such a type to permit of them being placed to direct their flame in a given direction, they are preferably so placed that the flame is directed down the furnace away from the smelting zone so that the latter is extended as much as possible. The position and number of burners depends upon several variable factors, including the dimensions of the furnace and the type of charge being treated. It is therefore impossible to define rigidly the limiting positions of the burners, particularly in view of the fact that where two furnaces treat charges of the same chemical composition the physical condition of the charge in the one case may be different from the physical condition of that in the other case and will, therefore, necessitate alterations in the position of the burners to take care of the different physical conditions.

The accompanying drawings further illustrate the invention.

Figure 1 is a plan view, partially in section, of a reverberatory furnace equipped with one pair of auxiliary burners.

Figure 2 is a longitudinal sectional elevation of the furnace shown in Figure 1.

Figure 3 is a section taken along the line 1—1 of Figure 1.

Figure 4 is a graph illustrating the operation of reverberatory furnaces with and without auxiliary burners.

Referring to the drawings, the furnace is illustreated generally at 1. The furnace includes main burners 2 at the back end of the furnace, pairs of feed hoppers 3 and 4 extending from the back end toward the front end of the furnace on either side thereof, and gas outlets 5 and slag outlets 6 at the front end of the furnace. All this is as usual in a reverberatory furnace.

According to the invention, a pair of auxiliary burners 7 are provided opposite each other on either side of the furnace. They are just beyond the feed hoppers 3 and at a point which corresponds to the end of the smelting zone if the furnace were not equipped with these burners. As a result of these, the further feed hoppers 4 are provided, if they are not already present, and the portion of the furnace to which substantial amounts of charge can be introduced is thus greatly increased.

The effect of the addition of these side burners can readily be seen by reference to Figure 4, which illustrates graphically the extent of the three zones of a furnace adapted to smelt a hypothetical charge having a melting point of, for instance, 2500° F. when the furnace is constructed in the usual manner and when the furnace is equipped with side burners according to the invention. In the graph, the temperatures are plotted on a base representing the length of the furnace. The temperature gradient of a furnace without side burners is indicated by the full line while the temperature gradient from a furnace equipped with side burners is differentiated from that without side burners in that where it leaves the latter curve, it is indicated by a dotted line. For convenience of representation the smelting zone, intermediate zone and settling zones are referred to as zones $a$, $b$ and $c$ respectively, and are so shown on the graph. Referring to the graph, it will be noted that when a furnace is not equipped with side burners the zone $a$ extends approximately one third of the length of the furnace away from the back end. The zone $b$ is a very short zone and zone $c$ is the largest of the three. It will also be seen that while the charge is well above its melting point all the time that it is in zone $a$ the charge in zone $b$ is partially below and partially above its melting point and for this reason only very little smelting takes place in this zone. However, when side burners are provided at the point where zone $a$ ends in the ordinary furnace, the temperature gradient does not fall so rapidly and the temperature of the charge remains well above the melting point until the charge has reached a point in the furnace almost corresponding to the beginning of the settling zone when the furnace was not equipped with the burners. Smelting in the smelting zone is therefore much more complete and the charge can be added to the furnace much farther down along its length. It will be seen that the smelting zone in a furnace which is not equipped with additional burners ends at a point well before that at which the charge has its temperature reduced to its melting point. That is to say, that for a charge whose melting point is approximately 2500° F. no more charge can be introduced after the temperature of the material has reached approximately 2700°. Although some smelting takes place right up to the point at which the melting point is reached, no charge can be introduced since any which would be added would not be completely smelted and would result, in the case of fine charges, in the production of "floaters." On the other hand, as will be seen from the graph, the addition of side burners at a point corresponding to the end of the smelting zone, when the furnace is not so equipped, extends the smelting zone, so that the bath is at approximately 2700° at a point much farther down the furnace. More charge can, therefore, be introduced without any danger of incomplete smelting. This charge can include fine materials, which otherwise would result in the production of "floaters."

Although it is impossible to give the specific position of the additional burners according to the invention for any particular charge or furnace, the following illustration will be helpful in understanding the invention.

Copper concentrates and siliceous flux are mixed in bins in the proportion of approximately 87% concentrate and 13% flux. The mixture is fed to roasters and the products of this operation consist of 92.5 per cent calcine and 7.5 per cent dust. These two products are charged to the reverberatory furnace independently and together form 96.5 per cent of the total solid furnace charge. The remainder of the charge is made up of other dusts and by-products from the smelter circuit as well as minor amounts of concentrates and flux charged independently, chiefly to protect the sidewalls. In addition, molten slag from the converters (where the matte is purified) is poured into the furnace, the tonnage being equal to about 40 per cent of the total reverberatory solid charge. In this case, the side burners are located about one-third of the way down the furnace from the back end. This point is well beyond the point at which it had been previously possible to add calcine to the charge without producing "floaters." Any "floaters" which are now produced by the calcine are completely smelted before reaching the settling zone.

I claim:

1. A reverberatory furnace comprising charging means for introducing metal bearing material and flux longitudinally of the furnace at the sides thereof, means at one end of the furnace for separately removing matte and slag and heating means for the furnace, said heating means including burners at the other end of the furnace adapted to throw flame so that it does not impinge directly on the charge and additional burners disposed longitudinally of the furnace and adapted to throw flame so that it does not impinge directly on the charge, said additional burners extending the smelting zone of the furnace and increasing the capacity thereof.

2. A reverberatory furnace comprising charging means for introducing metal bearing material and flux longitudinally of the furnace at the sides thereof, means at one end of the furnace for separately removing matte and slag, and heating means for the furnace, said heating means including burners at one end of the furnace adapted to throw flame so that it does not impinge directly on the charge and additional burners disposed longitudinally of the furnace to throw flame and towards the discharge end of the furnace so that said flame does not impinge directly on the charge and so that the smelting zone of the furnace is lengthened and its capacity increased without increasing its size.

3. A reverberatory furnace as defined in claim 1 in which the charging means are arranged in sections and the additional burners are disposed between the sections.

JOHN HOWARD AMBROSE.